Figure 1:
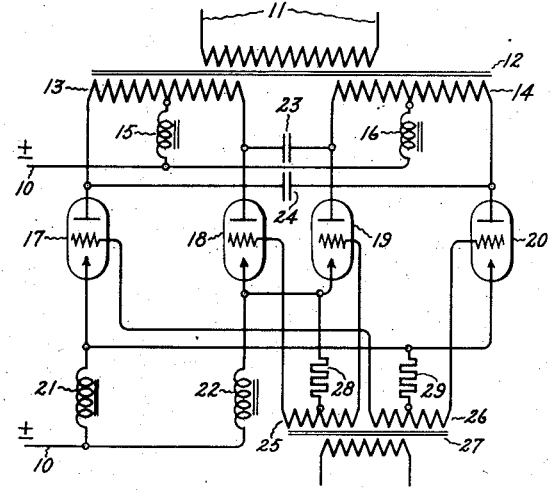

April 23, 1935.                M. A. ACHESON                1,999,013
                    ELECTRIC POWER CONVERTING APPARATUS
                    Filed Feb. 28, 1931         3 Sheets-Sheet 1

Inventor:
Marcus A. Acheson,
by Charles E. Mulla
His Attorney.

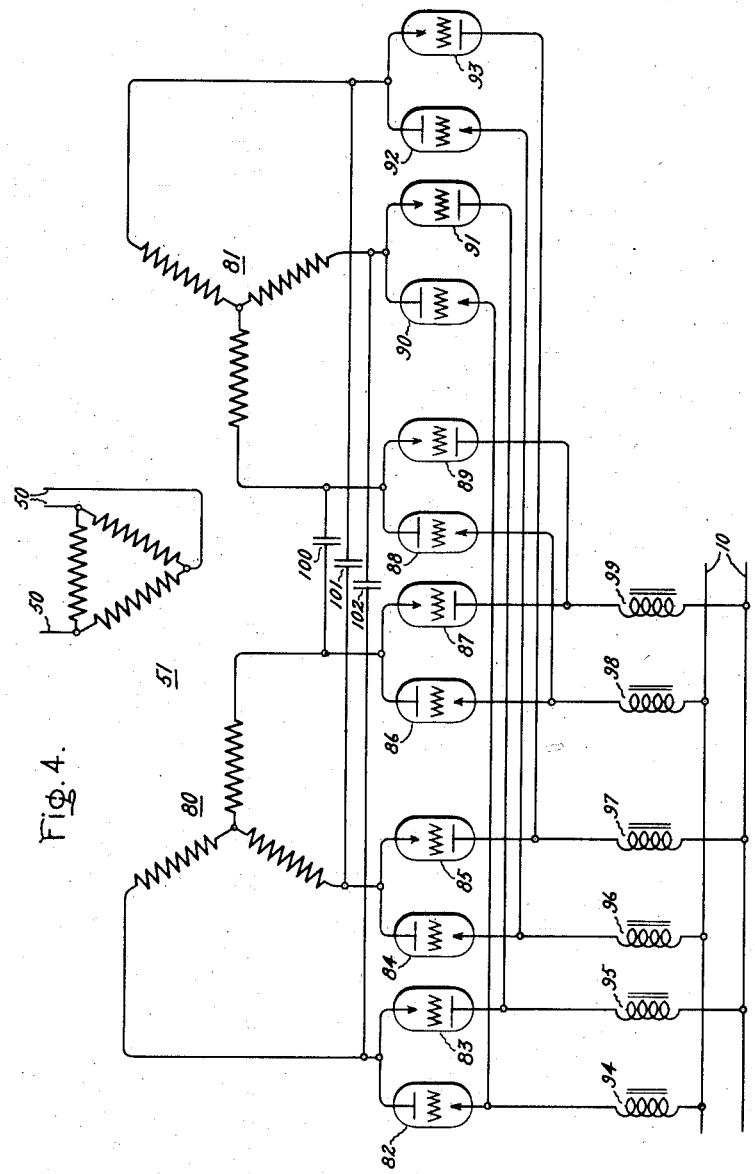

Patented Apr. 23, 1935

1,999,013

UNITED STATES PATENT OFFICE 1,999,013

ELECTRIC POWER CONVERTING APPARATUS

Marcus A. Acheson, Schenectady, N. Y., assignor to General Electric Company, a corporation of New York Application February 28, 1931, Serial No. 519,231

13 Claims. (Cl. 175—363)

My invention relates to electric power converting apparatus and more particularly to such apparatus utilizing electric valves for transmitting energy between direct and alternating current circuits.

Heretofore there have been proposed numerous arrangements including electric valves for transmitting energy between direct and alternating current circuits. In the arrangements of the prior art it has been customary to commutate the load current of the apparatus between two or more valves connected to a single inductive winding or network. With such an arrangement, however, it has been found that the failure of a single electric valve tends to short circuit either the direct current circuit or the alternating current circuit or both.

It is an object of my invention to provide an improved electric power converting apparatus utilizing electric valves which will overcome the above mentioned disadvantages of the arrangements of the prior art and which will be simple, economical and reliable in operation.

It is another object of my invention to provide an improved electric power converting apparatus including electric valves in which the load current is commutated between a plurality of electric valves connected to isolated inductive windings or networks.

It is a further object of my invention to provide an apparatus for transmitting energy between direct and alternating current circuits in which a plurality of valves associated with a single inductive winding are connected to the direct current circuit through one or more choke coils in order to substantially eliminate a short circuit on the alternating current circuit.

In accordance with my invention direct and alternating current circuits are interconnected through an apparatus comprising a plurality of inductive windings and an electric valve or valves connected to each terminal of the several windings. The load current is commutated only between valves connected to isolated inductive windings and the several groups of valves which commutate between themselves are connected to the direct current circuit through independent choke coils with the result that one or more of these choke coils is connected in series across each of the inductive windings to limit the short circuit current therethrough in case of the failure of any of the valves. According to certain modifications of my invention, not only are one or more choke coils interposed in the path of the short circuit alternating current, but at least two valves are connected in series in any path across the direct current circuit so that the possibility of a short circuit on either the direct or alternating current circuit, due to the failure of a single electric valve, is completely eliminated.

Figure 2:
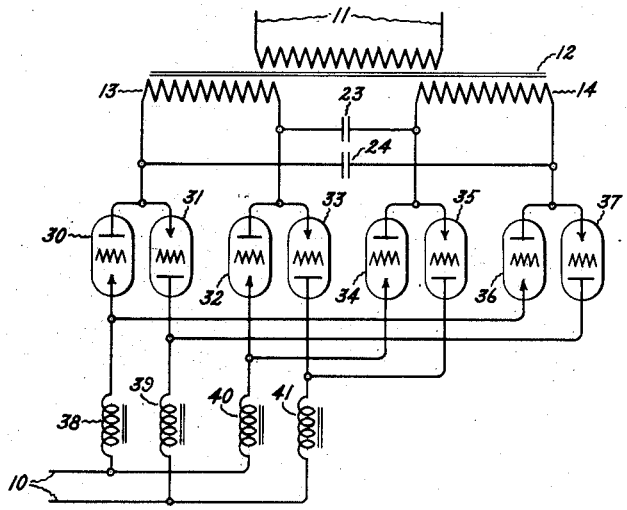
Figure 3:
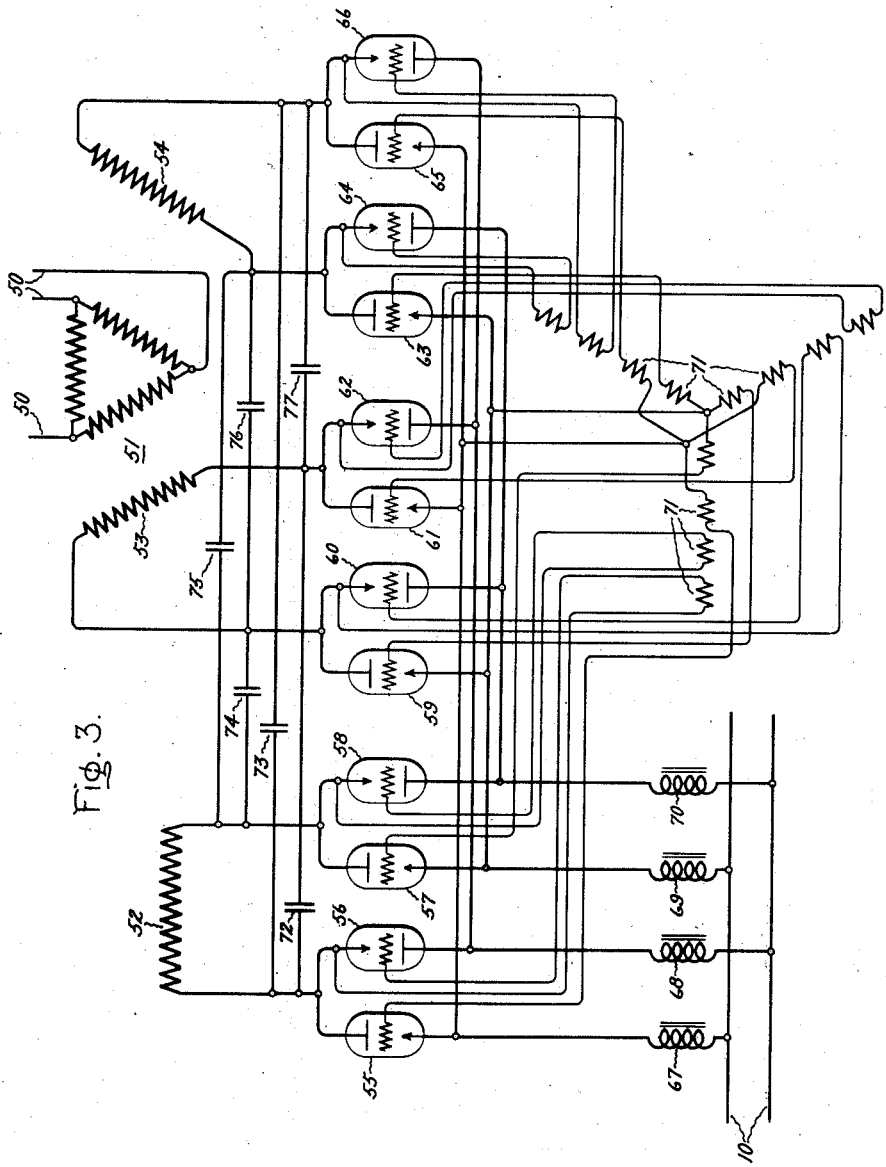

For a better understanding of my invention together with other and further objects thereof, reference is had to the following description taken in connection with the accompanying drawings, and its scope will be pointed out in the appended claims. Fig. 1 of the accompanying drawings illustrates my invention as applied to a single phase power converting apparatus for transmitting energy between direct and alternating current circuits; Fig. 2 illustrates the application of my invention to another type of single phase power converting apparatus; Fig. 3 shows an extension of the invention to a three-phase power converting apparatus, while Fig. 4 shows another type of three-phase power converting apparatus.

Referring more particularly to Fig. 1, I have illustrated an arrangement for transmitting energy between a direct current circuit 10 and an alternating current circuit 11. This apparatus comprises a transformer 12 having a primary winding connected to the alternating current circuit 11 and a pair of secondary windings 13 and 14, provided with electrical mid-points which are connected to one side of the direct current circuit 10 through the choke coils 15 and 16 respectively. While I have spoken of a primary winding connected to the circuit 11 and of secondary windings 13 and 14, it will be apparent to those skilled in the art that such a relation refers to the apparatus when operating as a rectifier and that when operating as an inverter the windings 13 and 14 will become primary windings while the winding connected to the circuit 11 will be a secondary winding. The outer terminals of the windings 13 and 14 are connected to the other side of the direct current circuit through the electric valves 17, 18, 19 and 20, and the choke coils 21 and 22, respectively, the valves associated with opposite terminals of the windings 13 and 14 being connected to the same choke coil. Electric valves 17, 18, 19 and 20 are each provided with an anode and a cathode and may be of any of the several types well known in the art, although I prefer to use valves of the vapor electric discharge type. In case the apparatus is to be utilized as an inverter for transmitting energy from the direct current circuit 10 to the alternating current circuit 11, the electric valves 17 to 20 inclusive are each provided with a control grid and the grids of the valves 18 and 19 are connected to their common cathode connection through opposite halves of a secondary winding 25 of a grid transformer 27 and a current limiting resistor 28, while the grids of the valves 17 and 20 are connected to their common cathode connection through opposite halves of a secondary winding 26 of the grid transformer 27 and a current limiting resistor 29. In case the alternating current circuit 11 is energized from an independent source, the primary winding of the grid transformer 27 may be energized from the same source. However, in case the circuit 11 is an independent circuit, the frequency of which is dependent upon the above described power converting apparatus, the primary winding of the grid transformer 27 may be energized either from the circuit 11 or from any suitable source of alternating current of the desired frequency. In the latter case it is necessary to provide commutating capacitors 23 and 24 connected between the inner and outer terminals respectively of the windings 13 and 14. It will be well understood by those skilled in the art that when the apparatus is operating as a rectifier delivering energy from the circuit 11 to the circuit 10, that the commutating capacitors 23 and 24 and the control grids of the valves 17 to 20 inclusive and their respective control circuits may be omitted.

In explaining the operation of the above described apparatus it will be assumed that it is operating as a rectifier, in which case commutating capacitors 23 and 24 and the various grid circuits may be neglected. It will be assumed, also, that the valves 17 and 19 are conducting current at the given instant. At the end of the particular half cycle the current in the valve 17 will be commutated to the valve 20, while the current in the valve 19 will be commutated to the valve 18. The commutation will take place between the electric valves 17 and 20, and 18 and 19, as indicated, because of the fact that the commutation or transfer of current between two electric valve circuits of such a rectifying system can only take place when the voltage producing such commutation is effective to decrease the current in one circuit from a given value to zero and increase it from zero to the same value in the other circuit against the counter-electromotive force of any reactance in the commutating circuit within a period substantially less than a normal conductive period of each circuit. For example, if it be assumed that electric valve 17 is conductive, as stated above, and if the rectifying circuit comprising the winding 14 and electric valves 19 and 20 be disregarded, it will be seen that it will be impossible to transfer the electric current from the valve 17 to 18. This commutating circuit includes the winding 13, electric valve 17, the choke coils 21 and 22 and electric valve 18. The commutation of the current involves the reduction of the current in the electric valve 17 to zero and the building up of the current in electric valve 18 to an equal value, which involves similar changes in the current in the choke coils 21 and 22. Choke coils 21 and 22 have such an impedance that the electromotive force of the winding 13 is not adequate to produce a substantial decrease in the current in the coil 21 and a corresponding increase in the current in the coil 22 within a half cycle of the alternating supply current. Thus, the commutation of the current from the electric valve 17 to electric valve 18 within a cycle or a fraction of a cycle, as is required for proper commutation, is prevented.

However, if the simultaneous commutation between electric valves 17 and 20, and 18 and 19 be considered, it will be seen that this commutating circuit comprises the winding 13, electric valve 17, electric valve 20, the winding 14, electric valve 19 and electric valve 18, to the other side of the winding 13. This circuit includes no external reactance, while it includes the electromotive forces of the windings 13 and 14 in series. Therefore, the commutation of this circuit may be substantially instantaneous.

In considering the protective features of the above described apparatus, it will be assumed, as in the first instance, that the electric valves 17 and 19 are initially conducting. In case of a failure of one of the valves, for example the valve 18, it will be noted that the winding 13 is short circuited through the valves 17 and 18 and the choke coils 21 and 22 in series, but due to the extremely high impedance of the coils 21 and 22 the short circuit current has a negligible value. It is necessary also to connect choke coils 15 and 16 between the electrical midpoints of the windings 13 and 14, respectively, and the direct current line 10 in order to prevent an alternating current short circuit on the right hand portion of the winding 13 and the left hand portion of the winding 14 through electric valves 18 and 19 under the assumed conditions. That is, at least two choke coils are included in any series circuit connecting any two terminals of the alternating current windings except the single circuit including the full windings 13 and 14, which includes four electric valves. By this means two choke coils or four valves are included in any alternating current short circuit path so that short circuit current on the alternating current circuit is either positively eliminated or reduced to a negligible value upon the failure of a single electric valve. This permits of the short circuiting of any valve which has failed and its replacement by a new valve without interrupting the operation of the apparatus. While four electric valves and four choke coils are utilized in this arrangement in place of the two valves and the single choke coil ordinarily used in a single phase power converting apparatus, it will be noted that the k. v. a. rating of these valves and choke coils has the same total as the corresponding elements of a power converting apparatus using only two valves and a single choke coil. This is true since each of the valves 17 to 20 inclusive is carrying only half of the total load current of the apparatus while each of the choke coils 15, 16, 21 and 22 is carrying also only half of the total load current and is subjected to only half of the ripple voltage which it is designed to smooth out. When the above described apparatus is operating as an inverter transmitting energy from the direct current circuit 10 to the alternating circuit 11, its operation is substantially similar, as will be well understood by those skilled in the art. The several grid circuits serving to render the valves alternately conductive and non-conductive and the commutating capacitors 23 and 24 serving to transfer the current between the valves in a manner similar to that when the apparatus is operating as a rectifier.

The apparatus described above is a half wave arrangement, that is, one in which the several portions of the secondary windings carry current only during alternate half cycles. In multiple circuit half wave arrangements of the prior art it has been customary to directly interconnect the electrical neutrals of the several windings to provide one terminal of the direct current circuit, while in the arrangement of Fig. 1 the neutrals of the windings 13 and 14 are electrically separated by the impedances 15 and 16, for the purpose described above. However, when my invention is applied to a full wave valve converting apparatus, the several windings may be electrically isolated, that is, separated by an infinite impedance, the windings being interconnected only through the several electric valves and, in case the apparatus is to operate as an inverter, by the commutating capacitors. Fig. 2 illustrates my invention as applied to a full wave single phase power converting apparatus in which the grid control circuits have been omitted for the sake of simplicity. It will be understood also that the commutating capacitors 23 and 24 may be omitted in case the apparatus is to operate as a rectifier. In this arrangement the terminals of the windings 13 and 14 are connected to one side of the direct current circuit 10 through electric valves 30, 32, 34 and 36, and choke coils 38 and 40, while these terminals are connected to the other side of the direct current circuit 10 through electric valves 31, 33, 35, and 37, respectively, and choke coils 39 and 41. It will be noted that, as in the arrangement illustrated in Fig. 1, each pair of valves which commutate between themselves is connected to the direct current circuit through a single choke coil, so that two choke coils are always connected in series across each inductive winding 13 and 14 to limit the short circuit current to a negligible value in case of the failure of any of the several electric valves. This arrangement has the additional advantage that two electric valves and two choke coils are included in any series circuit connecting the two sides of the direct current line 10 so that a short circuit of the direct current circuit is avoided in case of the failure of a single electric valve.

Fig. 3 illustrates an extension of my invention to an arrangement for transmitting energy between a direct current circuit 10 and a three-phase alternating current circuit 50. This arrangement includes a polyphase transformer 51 provided with a polyphase winding connected to the alternating current circuit 50 and with three isolated single phase windings 52, 53, and 54 connected across the direct current circuit 10 through electric valves 55 to 66 inclusive. The primary-secondary relationship of the windings of the transformer 51 is determined, of course, by the direction in which energy is being transferred between the alternating current circuit 50 and the direct current circuit 10. Corresponding valves associated with the windings 52, 53 and 54 are connected together and to the direct current circuit 10 through the choke coils 67, 68, 69, and 70, respectively. Each of the electric valves 55 to 66 inclusive is provided with an anode, and a cathode and is preferably of the vapor electric discharge type. In case the apparatus is to operate as an inverter, each of the several valves is also provided with a control grid which is connected to its respective cathode through a secondary winding 71 of a three-phase grid transformer, the secondary windings only of which are illustrated for the sake of simplicity. It will be apparent that the primary winding of this grid transformer may be energized directly from the alternating current circuit 50 or it may be connected thereto through a rotary phase shifting transformer in order to control the relative potentials of the circuits 10 and 50. In case the direct current circuit 10 is delivering energy to an alternating current circuit which is not provided with an independent counter-electromotive force, the commutating capacitors 72 to 77 inclusive may be connected between the circuits of the valves which commutate between themselves.

The operation of the above described apparatus as a rectifier will be considered first, in which case the several commutating capacitors and the grid control circuits may be neglected. The general principles of operation of a single-phase full wave rectifier will be well understood by those skilled in the art, so that a detailed explanation is not deemed necessary. It will be assumed, for example, that the phase rotation is counterclockwise, that current is initially flowing in a circuit including the winding 53, electric valve 59, the choke coil 69, the direct current circuit, choke coil 68 and electric valve 62. It will also be assumed that current has just been commutated to the circuit including the winding 54, electric valve 65, choke coil 67, the direct current circuit, the choke coil 70 and electric valve 64. The current flowing in this last mentioned circuit has been commutated from the circuit including the winding 52. However, the current flowing in the circuit including the winding 53 will persist for the next 60 electrical degrees since the winding 54 cannot commutate current from the winding 53 on account of the choke coils interposed between these two circuits. At the end of this 60-degree period the current is commutated from the above traced circuit including winding 53, to the circuit including the winding 52, electric valve 57, choke coil 69, the direct current circuit, choke coil 68 and electric valve 56. One hundred and twenty electrical degrees after the assumed initial point, current will be commutated from the above traced circuit including winding 54 to the circuit including winding 53, electric valve 61, choke coil 67, the direct current circuit, choke coil 70 and electric valve 60. In this manner the current will be successively commutated between the several windings, each of the several electric valves conducting current for 120 electrical degrees, that is, one-third of a cycle, and each of the several inductive windings conducting current for 120 electrical degrees twice each cycle, each conducting period being followed by a rest period of 60 degrees. The following table shows the sequence of the commutation between the several windings and electric valves, in each case the current being commutated to one winding from the second preceding winding in the order of phase rotation:

| Time (electrical degrees) | Winding | Valve | Choke coils | Valve |
|---|---|---|---|---|
| 0 | 53 | 59 | 69–68 | 62 |
|   | 54 | 65 | 67–70 | 64 |
| 60 | 52 | 57 | 69–68 | 56 |
| 120 | 53 | 61 | 67–70 | 60 |
| 180 | 54 | 63 | 69–68 | 66 |
| 240 | 52 | 55 | 67–70 | 58 |
| 300 | 53 | 59 | 69–68 | 62 |
| 360 | 54 | 65 | 67–70 | 64 |

As in the arrangement illustrated in Fig. 2 at least two choke coils or four valves are interposed in the path of any alternating current short circuit, while two choke coils and two valves are connected in series in the path of any short circuit current of the direct current circuit 10, thus effectively eliminating short circuits on either the direct or alternating current circuits. When the apparatus is operating as an inverter, the operation will be substantially the same, the several secondary windings 71 of the grid transformer serving to render the valves 55 to 66 inclusive, conductive in a proper sequence and the commutating capacitors 72 to 77 inclusive serving to commutate the current between the several valves in case the alternating current circuit 50 is not provided with an independent counter-electromotive force.

In Fig. 4 there is illustrated a modification of my invention suitable for transmitting energy between a direct current circuit 10 and a three-phase alternating current circuit 50. This apparatus comprises a polyphase transformer 51 having one three-phase winding connected to the three-phase alternating current circuit 50 and two three-phase windings 80 and 81 connected across the direct current line 10 through electric valves 82 to 93 inclusive, and the choke coils 94 to 99 inclusive. As in the previous arrangement, the valves 82 to 93 inclusive are preferably of the vapor electric discharge type and, in case it is desired to operate the apparatus as an inverter, are provided with control grids. In this arrangement it will be noted that the valves 82 and 83 commutate with the valves 90 and 91, the valves 84 and 85 with the valves 92 and 93 and the valves 86 and 87 with the valves 88 and 89; that is, the valves connected to one phase terminal commutate with valves connected to a phase terminal spaced 180 degrees. With such an arrangement each of the several valves is conducting for a full 180 degrees rather than for only 120 degrees as is usually the case when energy is transmitted between direct and three-phase alternating current circuits by use of electric valves. It is possible to extend the period of conductivity of the valves in this arrangement because of the fact that the current is not commutated between the valves associated with a single winding so that current can flow simultaneously in the same direction through two valves associated with a single winding even though the anode potential of one of these valves is higher than the other, a condition which is not ordinarily possible in the usual power converting apparatus. As in the previously described arrangements, commutating capacitors 100, 101 and 102 may be provided in case the alternating current circuit 50 is not provided with an independent electro-motive force and it is desired to transmit energy from the circuit 10 to the circuit 50. It will be apparent that in addition to this feature of extending the periods of conductivity of the valves, this arrangement also has the advantages, noted in connection with the preceding arrangement, of positively eliminating short circuits on either the direct or alternating current circuits due to the failure of a single electric valve. It will be obvious to those skilled in the art that either of the last described arrangements may be modified for half wave operation by eliminating one valve from each terminal and connecting one side of the direct current circuit to the neutral points of the several inductive windings through choke coils, as shown in Fig. 1. Also, they may be extended to any desired number of parallel circuits of any desired number of phases by applying the principles described above.

While I have described what I at present consider the preferred embodiments of my invention, it will be apparent to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. Apparatus for transmitting energy between direct and alternating current circuits comprising a plurality of inductive windings electrically separated by a high impedance, a plurality of electric valves for interconnecting the circuits through said windings, and means for successively commutating the current from a valve associated with one winding to a valve associated with another winding.

2. Apparatus for transmitting energy between direct and alternating current circuits comprising a plurality of inductive windings electrically separated by a high impedance, a plurality of electric valves for interconnecting the circuits through said windings, means for successively commutating the current from a valve associated with one winding to a valve associated with another winding, and impedance means connected between the several valves associated with a single inductive winding.

3. Apparatus for transmitting energy between direct and alternating current circuits comprising a plurality of inductive windings, a plurality of electric valves for interconnecting the circuits through said windings, a plurality of first circuits interconnecting each of the valves associated with one winding with a valve associated with another winding, and a plurality of second circuits of substantially higher impedance than said first circuits interconnecting the several valves associated with a single winding.

4. Apparatus for transmitting energy between direct and alternating current circuits comprising a plurality of inductive windings electrically separated by a high impedance, a plurality of electric valves for interconnecting the circuits through said windings, means for successively commutating the current from each valve associated with one winding to a valve associated with another winding, and a high reactance interposed in the connection of each valve associated with a single winding to the direct current circuit.

5. Apparatus for transmitting energy between direct and alternating current circuits comprising a plurality of inductive windings electrically separated by a high impedance, a plurality of electric valves for interconnecting the circuits through said windings, said windings and associated valves being connected in parallel to form groups with a phase displacement, each group of parallel connected electric valves having a common connection to said direct current circuit, and a reactance included in the common connection between each group of parallel connected valves and the direct current circuit.

6. In combination, direct and alternating current circuits and apparatus for transmitting energy therebetween comprising a plurality of inductive windings electrically separated by a high impedance, an electric valve connected to each terminal of said windings, a low impedance connection between each valve associated with one winding and a valve connected to a phase displaced terminal of another winding, and a connection including a high reactance between each valve associated with only one winding and the direct current circuit.

7. Apparatus for transmitting energy between direct and alternating current circuits comprising a plurality of $n$ $p$-phase inductive windings electrically separated by a high impedance, a plurality of electric valves for interconnecting the circuits through said windings, and means for successively commutating the current from a valve associated with one winding to a valve associated with another winding, whereby each of the several valves is conductive for $1/n$th of a cycle irrespective of the value of $p$.

8. Apparatus for transmitting energy between direct and alternating current circuits comprising a plurality of $n$ $p$-phase inductive windings, a plurality of electric valves for interconnecting the circuits through said windings, a low impedance connection between a valve associated with each terminal of one winding and a valve associated with a terminal of another winding displaced in phase $360/n$ electrical degrees, and high impedance connections between the other of said valves, whereby each of the several valves conducts current for $1/n$th of a cycle irrespective of the value of $p$.

9. In combination, direct and alternating current circuits and apparatus for transmitting energy therebetween comprising $n$ inductive windings electrically separated by a high impedance, a plurality of electric valves interconnecting said circuits through said windings, said windings and associated valves being connected to form $n$ parallel circuits with a phase displacement of $360/n$ electrical degrees, and a reactance included in the common connection between each group of parallel connected valves and the direct current circuit.

10. In combination, direct and alternating current circuits and apparatus for transmitting energy therebetween comprising a plurality of $n$ inductive windings each provided with an electrical neutral, separate connections including a reactance from each of said neutrals to one side of said direct current circuit, a single electric valve connected to each terminal of said windings, said windings and associated valves being connected in $n$ parallel circuits with a phase displacement of $360/n$ electrical degrees, and a connection including a reactance between each group of parallel connected valves and the other side of the direct current circuit.

11. In combination, direct and alternating current circuits and apparatus for transmitting energy therebetween comprising a plurality of inductive windings, a pair of oppositely connected electric valves associated with each terminal of said windings, said windings and valves being connected in parallel with a phase displacement, a connection including a reactance between each group of parallel connected valves of one polarity and one side of the direct current circuit and a connection including a reactance between each group of parallel connected valves of opposite polarity and the other side of the direct current circuit.

12. In combination, direct and alternating current circuits and apparatus for transmitting energy therebetween comprising a plurality of electrically separated inductive windings, a plurality of electric valves interconnecting said circuits through said windings, a high reactance interposed between the several valves associated with a single one of said windings, and means for successively commutating the current from a valve associated with one winding to a valve associated with another winding.

13. Apparatus for transmitting energy between direct and alternating current circuits comprising a plurality of inductive windings each provided with an electrical midpoint, an impedance interconnecting the midpoints of said windings, a plurality of electric valves for interconnecting said circuits through said windings, and means for successively commutating the current from a valve associated with one winding to a valve associated with another winding.

MARCUS A. ACHESON.